(12) United States Patent
Rodriguez et al.

(10) Patent No.: US 8,817,292 B1
(45) Date of Patent: Aug. 26, 2014

(54) PRINTING SYSTEMS AND METHODS PROVIDING A RASTER IMAGE PROCESSING PERFORMANCE PREFLIGHT OPTION

(71) Applicant: XEROX Corporation, Norwalk, CT (US)

(72) Inventors: Jesus Rodriguez, Downey, CA (US); George Gov, Hawthorne, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/863,587

(22) Filed: Apr. 16, 2013

(51) Int. Cl.
*G06K 15/00* (2006.01)
*G06F 3/12* (2006.01)

(52) U.S. Cl.
CPC ............ *G06F 3/1211* (2013.01); *G06F 3/1244* (2013.01)
USPC ......................................... 358/1.14; 358/1.15

(58) Field of Classification Search
CPC .... G06F 3/1211; G06F 3/1244; G06F 3/1284
USPC ................................................ 358/1.14–1.15
See application file for complete search history.

(56) References Cited

U.S. PATENT DOCUMENTS

| | | | |
|---|---|---|---|
| 5,473,741 A | 12/1995 | Neufelder et al. | |
| 6,259,821 B1 | 7/2001 | Branciforte et al. | |
| 6,469,805 B1 | 10/2002 | Behlok | |
| 7,630,098 B2 | 12/2009 | Nagarajan et al. | |
| 8,144,355 B2 | 3/2012 | Nelson et al. | |
| 8,237,962 B2 | 8/2012 | Horn et al. | |
| 2005/0034022 A1 | 2/2005 | Wiechers et al. | |
| 2005/0034030 A1 | 2/2005 | Wiechers | |
| 2007/0247658 A1* | 10/2007 | Barnes | 358/1.15 |
| 2008/0130035 A1* | 6/2008 | Smith | 358/1.15 |
| 2010/0103444 A1 | 4/2010 | Farrell et al. | |
| 2010/0141984 A1 | 6/2010 | Horn, Jr. et al. | |
| 2011/0157619 A1 | 6/2011 | Nelson et al. | |
| 2011/0188062 A1 | 8/2011 | Sweet et al. | |
| 2011/0216345 A1 | 9/2011 | Horn | |
| 2011/0292412 A1 | 12/2011 | Klassen et al. | |

* cited by examiner

*Primary Examiner* — Benny Q Tieu
*Assistant Examiner* — Quyen V Ngo
(74) *Attorney, Agent, or Firm* — Gibb & Riley, LLC

(57) ABSTRACT

Disclosed is a printing system having a raster image processing performance preflight option and an associated printing method. When the performance preflight option is selectively enabled, the printing system parses a print job to acquire data object statistics, performs preliminary raster image processing of the print job to generate preliminary raster pages, monitors the preliminary raster image processing to acquire performance statistics, determines (based on the performance statistics) whether or not the print job meets predefined specifications for raster image process timing and generates and displays a summary report. Page-specific selectable reports can be embedded in the summary report to allow a user to selectively view page-specific data object statistics and visual representations of specific preliminary raster pages. Such reports can be used to modify the print job in order to improve raster image processing timing prior to printing.

24 Claims, 4 Drawing Sheets

PRINTING SYSTEMS AND METHODS PROVIDING A RASTER IMAGE PROCESSING PERFORMANCE PREFLIGHT OPTION

BACKGROUND

Systems and methods herein generally relate to document printing and, more particularly, to a raster image process performance preflight technique for collecting and displaying preliminary raster image processing performance statistics and data object statistics associated with a document print job prior to document printing in order to allow the print job to be modified to improve the raster image processing rate for the print job as a whole and/or to improve the raster image processing time for individual pages in the print job and, thereby to enhance printing efficiency.

More particularly, a printing system typically comprises a raster image processor that receives a print job for a document and performs raster image processing of that print job in order to produce raster pages (also referred to as bitmaps), which are forwarded to one or more print engines for output (i.e., for printing of the document). The raster image processing rate for a print job (i.e., the average speed measured in, for example, pages per minute (PPM), at which the raster pages for a print job are produced) and the raster image processing time for any individual page in a print job (i.e., the time measured in, for example, seconds, it takes for an individual raster page to be generated) have a direct impact on the performance of the print engine.

For example, oftentimes manufacturers of printing systems and, particularly, manufacturers of high-end printing systems specify print timing specifications. In order to meet these print timing specifications, corresponding raster image processing timing specifications must first be met. Specifically, print timing specifications such as, a relatively high minimum print rate (e.g., in pages per minute (PPM), such as a minimum print rate of 50 PPM to 1000 PPM or higher) and a relatively low maximum per page print time (e.g., in seconds, such as a maximum print time of 60 seconds or lower), can only be achieved if corresponding raster image process specifications such as, a minimum raster image processing rate for a print job and a maximum raster image processing time per page in the print job, are first met. Achieving print timing specifications is especially important in a continuous feed-type printing system because such a printing system is typically unable to stop or slow down mid-print job to accommodate slow raster image processing of individual page(s). Furthermore, even if a continuous-feed type printing system is able to stop or slow-down mid-print job to accommodate slow raster image processing of individual page(s), stopping or slowing down mid-print job will cause a decrease in print productivity and unnecessary wear on the print engine. This high minimum print rate requirement is also important in cut-sheet-type printing system, again, because slowing down or stopping mid-print job to accommodate slow raster image processing of individual page(s) can cause a decrease in print productivity and unnecessary wear on the print engine.

SUMMARY

In view of the foregoing, disclosed herein is a printing system enabled to perform a raster image processing performance preflight technique prior to document printing. This preflight technique involves collecting and displaying preliminary raster image processing performance statistics and data object statistics associated with a document print job in order to allow a user to modify the print job and improve the raster image processing rate for the print job and/or the raster image processing time for specific pages within the print job. The printing system receives a print job with a user input selectively enabling a raster image processing performance preflight option instead of a printing option. The printing system then parses the print job to acquire data object statistics, performs preliminary raster image processing of the print job to generate preliminary raster pages, monitors the preliminary raster image processing to acquire performance statistics, determines (based on the performance statistics) whether or not the print job meets predefined specifications for raster image process timing, and generates and displays a summary report indicating whether the print job failed to meet the predefined specifications and, if so, further indicating at least some of the performance statistics and the data object statistics for the print job. Page-specific selectable reports can be embedded in the summary report to allow a user to selectively view page-specific data object statistics and visual representations of specific preliminary raster pages. Such reports can subsequently be used to modify the print job to improve the raster image processing rate for the print job and/or the raster image processing time for specific pages within the print job and, thereby improve printing efficiency. Also disclosed herein is an associated printing method.

More particularly, disclosed herein is a printing system enabled to perform a raster image processing performance preflight technique. The printing system can comprise at least an input/output, a print engine, a storage medium, a graphic user interface (GUI) and a controller, which is operatively connected to the input/output, the print engine, the computer readable storage medium and the GUI. The controller can comprise at least a raster image processor, a performance monitor, a performance analyzer, a parser, an optional image object analyzer, and a report generator.

In such a printing system, the input/output can receive a print job. This print job can be formatted in a page description language (PDL) and can describe a document to be printed by the print engine. The input/output can also receive a user input selectively enabling a raster image processing performance preflight option for the print job instead of a printing option (i.e., printing operations associated with the print job are temporarily disabled).

When the raster image processing performance preflight option is enabled for a print job, the raster image processor can perform preliminary raster image processing of the print job to generate preliminary raster pages (i.e., preliminary bitmaps). Each preliminary raster page can correspond to a page in the document and can comprise one or more different types of data objects (e.g., any one or more of the following: image objects; graphic objects; text objects; container resource objects; barcode objects and printer resource objects (also referred to as home state objects)). However, instead of serially generating and forwarding the preliminary raster pages to the print engine for printing (as would be the case for final (i.e., actual) raster pages during printing), the raster image processor can store the raster pages in the storage medium for subsequent report generation.

As the preliminary raster pages are generated, the performance monitor can perform a monitoring process (i.e., can monitor the preliminary raster image processing) in order to acquire performance statistics associated with the preliminary raster image processing. The performance statistics can comprise, for example, the raster image processing rate (e.g., in pages per minute (PPM)) for the print job as a whole and also the raster image processing time (e.g., in seconds) for each page in the print job.

Then, the performance analyzer can determine, based on the performance statistics, when the print job meets predefined specifications for raster image process timing and when the print job fails to meet the predefined specifications. Such predefined specifications can be stored in the storage medium and typically can comprise, for example, a manufacturer specified minimum raster image processing rate for any print job and a manufacturer specified maximum raster image processing time for any page in a print job.

Additionally, the parser can parse the print job to acquire data object statistics comprising statistics related to the presence of different types of data objects in the print job as a whole and statistics related to the presence of different types of data objects on each page within the print job. Specifically, the data object statistics can comprise any of the following for the print job as a whole and also for each page in the print job: image object statistics; graphic object statistics; text object statistics; container object statistics; barcode object statistics; and printer resource object statistics.

Following operation of the performance analyzer and parser, the report generator can generate and output a first report (i.e., a summary report), which indicates whether the print job meets the predefined specifications for raster image process timing. When the print job fails to meet the predefined specifications, this first report can further indicate the performance statistics for the print job as a whole, as acquired during preliminary raster image processing, and also the data object statistics for the print job as a whole, as acquired during parsing of the print job. Since printing operations associated with this print job are disabled when the preliminary raster image processing performance preflight option is enabled, this first report will be output (e.g., displayed by the GUI) before the print engine ever initiates any printing of the document.

Furthermore, this first report can be output and, particularly, displayed by the GUI such that it comprises embedded selectable second reports and, particularly, embedded selectable page-specific reports. That is, in addition to generating the first report, as described above, the report generator can further generate second reports for some or all of the preliminary raster pages. These second reports can comprise page-specific performance and data object statistics for and visual representations of the preliminary raster pages. Specifically, the report generator can generate second reports for all of the preliminary raster pages or for only selected preliminary raster pages (e.g., for only raster pages that fail to meet the predefined maximum raster image processing time, for only a set number of raster pages requiring the most raster image processing time, etc.). In any case, these second reports can be embedded in the first report such that, in response to selection by a user of a specific preliminary raster page referenced in the first report, a second report is displayed by the GUI. This second report can comprise page-specific performance and data object statistics for the specific preliminary raster page and a visual representation of the specific preliminary raster page. The visual representation can illustrate the data objects on the specific preliminary raster page and each of these data objects can further be selectable on the GUI such that, in response to selection by a user of a data object, formatting and attribute information specific to the data object is displayed (e.g., by the GUI in a pop-up window).

It should be noted that, when the first report indicates that the print job failed to meet the predefined specifications, the performance statistics, data object statistics and other information in the first and second reports, as described above, can be employed by a user to modify the print job and/or to make recommendations as to how a print job can be modified in order to improve raster image processing performance (i.e., to increase the raster image processing rate or decrease the raster image processing time associated with specific pages). In this case, after at least the first report is output, the input/output can receive a modified print job for the document to be printed by the print engine and a user input selectively enabling or disabling the raster image processing performance preflight option for the modified print job. If the raster image processing performance preflight option is selectively enabled for the modified print job, performance analysis associated with the modified print job and report generation and output can proceed as described above. If the raster image processing performance preflight option is selectively disabled for the modified print job, final raster image processing and printing of the document can proceed.

Optionally, in the printing system described above, the controller can further comprise an image object analyzer. This image object analyzer can analyze the preliminary raster pages that are stored in the storage medium in order to identify any duplicate image objects within the preliminary raster pages. This process of analyzing the preliminary raster pages to identify duplicate image objects can be performed, for example, using a heuristic approach. In this case the report generator can generate the first report so that it indicates, not only the performance statistics and the data object statistics discussed above, but so that it also recommends caching of previously identified duplicate image objects (e.g., recommends converting the duplicated image object into a printer resource object, such as a page segment or overlay).

Also disclosed herein is a printing method that incorporates a raster image process (RIP) performance preflight technique. The method can comprise receiving (e.g., by an input/output of a printing system) a print job. This print job can be formatted in a page description language (PDL) and can describe a document to be printed by a print engine of the printing system. The method can further comprise receiving a user input selectively enabling a raster image processing performance preflight option for the print job instead of a printing option (i.e., printing operations associated with the print job are temporarily disabled).

When the raster image processing performance preflight option is enabled for a print job, the method can further comprise performing preliminary raster image processing of the print job to generate preliminary raster pages (i.e., preliminary bitmaps). This preliminary raster image processing can be performed, for example, by a controller and, particularly, by a raster image processor thereof. This preliminary raster image processing can further be performed such that each preliminary raster page generated corresponds to a page in the document and comprises one or more different types of data objects (e.g., any one or more of the following: image objects; graphic objects; text objects; container resource objects; barcode objects and printer resource objects (also referred to as home state objects)). However, instead of serially generating and forwarding the preliminary raster pages to the print engine for printing (as would be the case with final (i.e., actual) raster pages during printing), following preliminary raster image processing, the preliminary raster pages can be stored (e.g., by the controller and, particularly, by the raster image processor) in a storage medium of the printing system for subsequent report generation.

As the preliminary raster pages are generated (i.e., as preliminary raster image processing is performed), a performance monitoring process can also be performed (e.g., by the controller and, particularly, by a performance monitor thereof). This monitoring process can be performed in order to acquire performance statistics associated with the preliminary raster image processing. The performance statistics can comprise, for example, the raster image processing rate (e.g., in pages per minute (PPM)) for the print job as a whole and also the raster image processing time (e.g., in seconds) for each page in the print job.

Based on the performance statistics, a determination can be made (e.g., by the controller and, particularly, by a performance analyzer thereof) as to whether or not the print job meets predefined specifications for raster image process timing (i.e., as to when the print job meets the predefined specifications and when the print job fails to meet the predefined specifications). Such predefined specifications can be stored in the storage medium and typically can comprise, for example, a manufacturer specified minimum raster image processing rate for any print job and a manufacturer specified maximum raster image processing time for any page in a print job.

Additionally, the print job can be parsed (e.g., by the controller and, particularly, by a parser thereof) to acquire data object statistics. These data object statistics can comprise statistics related to the presence of different types of data objects in the print job as a whole and statistics related to the presence of different types of data objects on each page within the print job. Specifically, the data object statistics can comprise any of the following for the print job as a whole and also for each page in the print job: image object statistics; graphic object statistics; text object statistics; container object statistics; barcode object statistics; and printer resource object statistics.

Next, a first report (i.e., a summary report) can be generated and output (e.g., by the controller and, particularly, by a report generator of the printing system). This first report can be generated such that it indicates whether or not the print job meets the predefined specifications and such that, when the print job fails to meet the predefined specifications, it further indicates the performance statistics for the print job as a whole, as acquired during preliminary raster image processing, and also the data object statistics for the print job as a whole, as acquired during parsing of the print job. Since printing operations associated with the print job are disabled when the preliminary raster image processing performance preflight option is enabled, this first report can be output (e.g., displayed by a graphic user interface (GUI) of the printing system) before the print engine ever initiates any printing of the document.

Furthermore, this first report can be output and, particularly, displayed (e.g., by the GUI) such that it comprises embedded selectable second reports and, particularly, embedded selectable page-specific reports. That is, in addition to generating the first report, as described above, second reports for some or all of the preliminary raster pages can be generated (e.g., by the same report generator). These second reports can comprise page-specific performance and data object statistics for and visual representations of the preliminary raster pages. Specifically, second reports can be generated (e.g., by the report generator) for all of the preliminary raster pages or for only selected preliminary raster pages (e.g., for only raster pages that fail to meet the predefined maximum raster image processing time, for only a set number of raster pages requiring the most raster image processing time, etc.). In any case, these second reports can be embedded (e.g., by the graphic user interface) in the first report such that, in response to selection by a user of a specific preliminary raster page referenced in the first report, a second report is displayed. This second report can comprise page-specific performance and data object statistics for the specific preliminary raster page and a visual representation of the specific preliminary raster page. The visual representation can illustrate the data objects on the specific preliminary raster page and each of these data objects can further be selectable on the graphic user interface such that, in response to selection by a user of a data object, the graphic user interface can display (e.g., in a pop-up window) formatting and attribute information specific to the data object.

It should be noted that, when the first report indicates that the print job failed to meet the predefined specifications, the performance statistics, data object statistics and other information in the first and second reports, as discussed above, can be employed by a user to modify the print job and/or to make recommendations as to how a print job can be modified in order to improve raster image processing performance (i.e., to increase the raster image processing rate or decrease the raster image processing time associated with specific pages). In this case, the method can further comprise receiving (e.g., at the input/output after at least the first report is output) a modified print job for the document to be printed by the print engine and a user input selectively enabling or disabling the raster image processing performance preflight option for the modified print job. If the raster image processing performance preflight option is selectively enabled for the modified print job, performance analysis of the modified print job and report generation and output can proceed as described above. If the raster image processing performance preflight option is selectively disabled for the modified print job, final raster image processing and printing of the document can proceed.

Optionally, before the first report is generated, the printing method described above can further comprise analyzing the preliminary raster pages that are acquired during preliminary raster image processing and stored in the storage medium. This process of analyzing the preliminary raster pages can be performed, for example, by the controller and, particularly, by an image object analyzer thereof, in order to identify any duplicate image objects within the preliminary raster pages. This process of analyzing the preliminary raster pages to identify duplicate image objects can be performed, for example, using a heuristic approach. In this case, the process of generating the first report can further be performed so that the first report indicates, not only the performance statistics and the data object statistics, but so that it also recommends caching of previously identified duplicate image objects (e.g., recommends converting the duplicated image object into a printer resource object, such as a page segment or overlay).

These and other features are described in, or are apparent from, the following detailed description.

BRIEF DESCRIPTION OF THE DRAWINGS

Various exemplary systems and methods are described in detail below, with reference to the attached Figures, in which.

DETAILED DESCRIPTION

Figure 1:
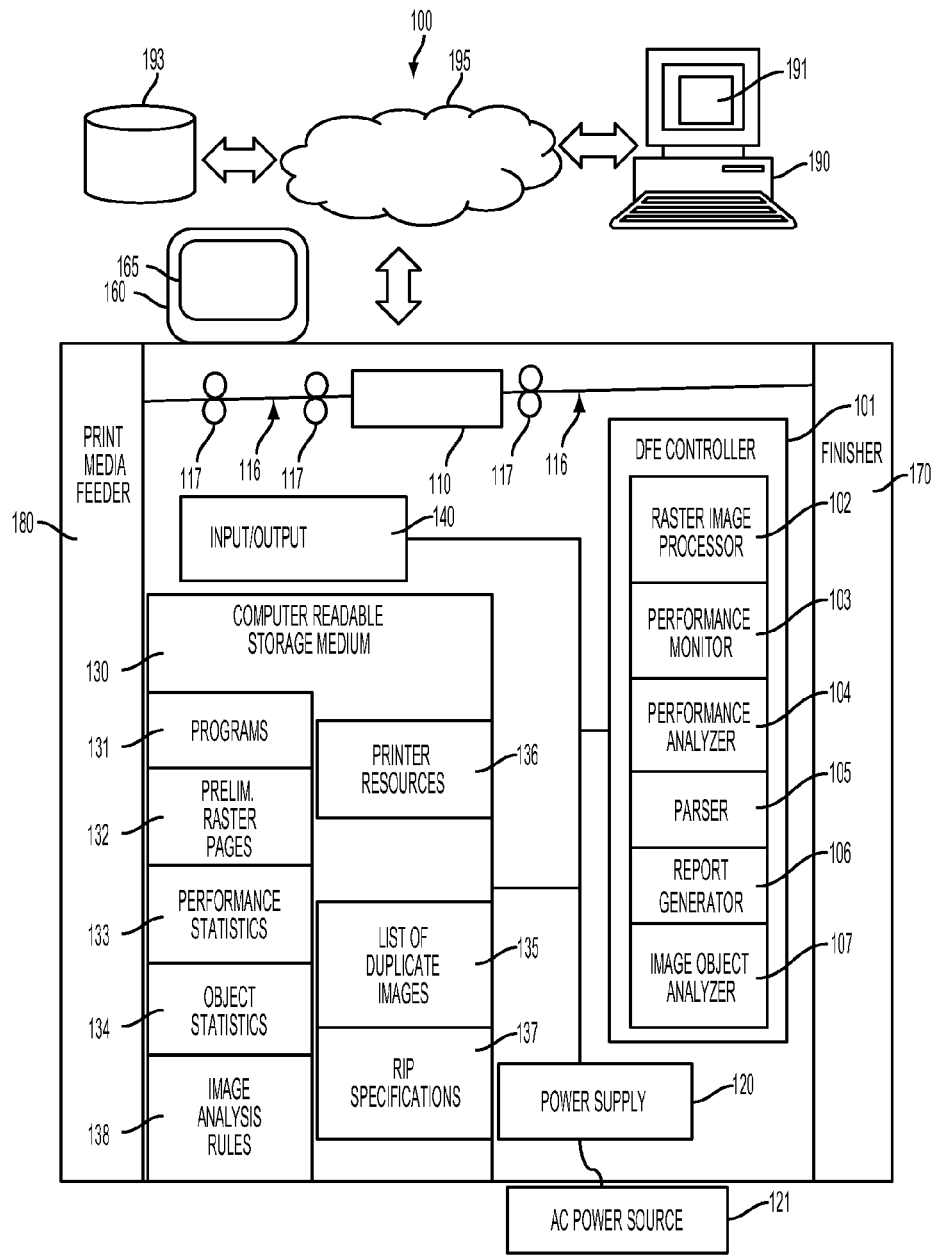
FIG. 1 is a schematic drawing illustrating a computerized printing system with a raster image processing performance preflight option.

As mentioned above, a printing system typically comprises a raster image processor that receives a print job for a document and performs raster image processing of that print job in order to produce raster pages (also referred to as bitmaps), which are forwarded to one or more print engines for output (i.e., for printing of the document). The raster image processing rate for a print job (i.e., the average speed measured in, for example, pages per minute (PPM), at which the raster pages for a print job are produced) and the raster image processing time for any individual page in a print job (i.e., the time measured in, for example, seconds, it takes for an individual raster page to be generated) have a direct impact on the performance of the print engine.

For example, oftentimes manufacturers of printing systems and, particularly, manufacturers of high-end printing systems specify print timing specifications. In order to meet these print timing specifications, corresponding raster image processing timing specifications must first be met. Specifically, print timing specifications such as, a relatively high minimum print rate (e.g., in pages per minute (PPM), such as a minimum print rate of 50 PPM to 1000 PPM or higher) and a relatively low maximum per page print time (e.g., in seconds, such as a maximum print time of 60 seconds or lower), can only be achieved if corresponding raster image process specifications such as, a minimum raster image processing rate for a print job and a maximum raster image processing time per page in the print job, are first met. Achieving print timing specifications is especially important in a continuous feed-type printing system because such a printing system is typically unable to stop or slow down mid-print job to accommodate slow raster image processing of individual page(s). Furthermore, even if a continuous-feed type printing system is able to stop or slow-down mid-print job to accommodate slow raster image processing of individual page(s), stopping or slowing down mid-print job will cause a decrease in print productivity and unnecessary wear on the print engine. This high minimum print rate requirement is also important in cut-sheet-type printing system, again, because slowing down or stopping mid-print job to accommodate slow raster image processing of individual page(s) can cause a decrease in print productivity and unnecessary wear on the print engine.

In view of the foregoing, disclosed herein is a printing system enabled to perform a raster image processing performance preflight technique prior to document printing. This preflight technique involves collecting and displaying preliminary raster image processing performance statistics and data object statistics associated with a document print job in order to allow a user to modify the print job and improve the raster image processing rate for the print job and/or the raster image processing time for specific pages within the print job. The printing system receives a print job and a user input selectively enabling a raster image processing performance preflight option. The printing system parses the print job to acquire data object statistics, performs preliminary raster image processing of the print job to generate preliminary raster pages, monitors the preliminary raster image processing to acquire performance statistics, determines (based on the performance statistics) whether or not the print job meets predefined specifications for raster image process timing, and generates and displays a summary report indicating whether the print job failed to meet the predefined specifications and, if so, further indicating at least some of the performance statistics and the data object statistics for the print job. Page-specific selectable reports can be embedded in the summary report to allow a user to selectively view page-specific data object statistics and visual representations of specific preliminary raster pages. Such reports can subsequently be used to modify the print job to improve the raster image processing rate for the print job and/or the raster image processing time for specific pages within the print job and, thereby improve printing efficiency. Also disclosed herein is an associated printing method.

More particularly, referring to FIG. 1, disclosed herein is a computerized printing system 100 enabled to perform a raster image processing performance preflight technique.

The printing system 100 can comprise a plurality of different functional components. These functional components can comprise, for example, a print media feeder 180, at least one print media transport path 116 incorporating a plurality of print media transport devices 117, one or more print engines 110 (also referred to herein as printing devices, marking devices, image rendering devices, etc.), a finisher 170, an input/output 140, a non-transitory computer readable storage medium 130 (e.g., an optical storage medium, magnetic storage medium, capacitor-based storage medium, etc.), a graphic user interface (GUI) 160 comprising a display screen 165, and a digital front end (DFE) controller 101, which is operatively connected to each of the other components referenced above (i.e., to the print media feeder 180, print media transport path(s) 116 and, particularly, the media transport devices 117, print engine(s) 110, finisher 170, input/output 140, computer readable storage medium 130, graphic user interface (GUI) 160, etc.).

The print media feeder 180 can comprise a continuous feed-type print media feeder (i.e., a print media feeder that feeds continuous form print media, such as paper or other suitable print media) or a sheet-type print media feeder (i.e., a print media feeder that feeds sheets of print media, such as paper or other suitable print media) that can feed (e.g., can be adapted to feed, can be configured to feed, etc.) print media to a print media transport path 116 in a printing system. The print media transport path(s) 116 and, particularly, the print media transport devices 117 incorporated therein can transport (e.g., can be adapted to transport, can be configured to transported, etc.) the print media through the printing system 100 and, particularly, through the print engine(s) 110 and to the finisher 170. The print engine(s) 110 can print (i.e., mark) the print media as specified in a print job (see detailed discussion below) and can comprise, for example, single color (i.e., monochrome) and/or multi-color print engine(s) 110 that can print (e.g., can be adapted to print, can be configured to print, etc.) in simplex format (i.e., on a single surface of a print media sheet) and/or duplex format (i.e., on opposing surfaces of a print media sheet). Following printing on the print media, the finisher 170 can cut, fold, staple, sort, and/or stack the print media. Various different types of print media feeders, print media transport devices, print engines and finishers are well known in the art and, thus, the details thereof are omitted from the specification in order to allow the reader to focus on the salient aspects of the disclosed printing system and method.

In any case, the DFE controller 101 (also referred to herein as DFE processor or simply as a controller) can comprise a computerized device, such as a FreeFlow™ Print Server produced by Xerox Corporation of Norwalk, Conn. The controller 101 can comprise one or more computer processing units (i.e., one or more processors) that can operatively control (e.g., can be adapted to operatively control, can be configured to operatively control, can be programmed to control, etc.) the operations of the various functional components of the printing system 100, referred to above, in order to receive, process and print document print jobs.

Specifically, the input/output 140 can comprise a communication port operatively connected between the DFE controller 101 and a wired or wireless network 195 (e.g., a local area network (LAN), wide area network (WAN), internet, etc.) to allow for communications between the DFE controller 101 and other devices (e.g., an external computerized device 190 and, particularly, a host server, and/or any other external data source 193). Specifically, the input/output 140 can receive (e.g., can be adapted to receive, configured to receive, etc.) a print job from the computerized device 190 or other external data source 193 and can communicate that print job to the DFE controller 101. This print job can be formatted in a page description language (PDL) and can describe a document to be printed by the print engine(s) 110 and, particularly, can provide include the page-level data to be printed.

For illustration purposes, the printing system 100 will be described herein as using the Intelligent Printer Data Stream™ (IPDS) page description language (PDL). However, alternatively, any other page description language (PDL) could be used for the print job including, but not limited to, PostScript (PS) and Portable Document Format (PDF).

Those skilled in the art will recognize that the primary advantage to using IPDS print jobs is that they provide for an object oriented architecture that makes it possible to print pages that contain a mixture of different data object types. Specifically, IPDS print jobs can comprise a mixture of different data object types in the form of in-line data objects and alternative resource data objects. The in-line data objects comprise commands as well as data that are received by the printing system 100 at the input/output 140 along with the print job. These in-line data objects can include, but are not limited to, image objects (e.g., commands to present image data; Image Object Content Architecture (IOCA)); graphic objects (e.g., commands to present graphic data; Graphic Object Content Architecture (GOCA)); text objects (e.g., write text commands and orders; Presentation Text Object Content Architecture (PTOCA)); and barcode objects (e.g., commands to present machine-readable bar codes; Bar Code Object Content Architecture (BCCA)). The alternative resource data objects can comprise printer resource objects (also referred to as home state resource objects), which are commands to present constructs, such as page segments or overlays, that are stored locally for repeated use (e.g., see printer resources 136 stored in the storage medium 130), or container resource objects, which are not native IPDS objects acquired from other data resources and presented in a different page description language, such as PS or PDF. It should be noted that the term "overlay" refers to a construct, such as a macro or electronic form, which comprises text block data, image block data, graphic block data, barcode block data and/or container resource block data and which is independent of the logical page environment, and the term "page segment" refers to a construct that is similar to that of an overlay, but which is merged with the logical page environment.

Those skilled in the art will further recognize that any number of different applications can be used to produce IPDS print jobs. Specifically, numerous applications can be used to produce Intelligent Printer Data Stream™ (IPDS) print jobs directly or can be used by, for example, a customer to produce Advanced Function Presentation (AFP) print jobs, which are then typically converted into Intelligent Printer Data Stream™ (IPDS) print jobs by a print service provider. Unfortunately, it is not always obvious how AFP and/or IPDS print jobs are constructed. Poorly constructed print jobs can result in relatively long raster image processing times for individual pages in a document as well as a relatively low raster image processing rate (i.e., a relatively low number of raster pages per minute). Poorly constructed print jobs often occur when the print job (e.g., an AFP print job) is produced (e.g., by a customer) with no knowledge of the selected printer that will eventually be used (e.g., by the print service provider) to print the print job and/or with no knowledge of the performance features of the selected printer.

When a print job is poorly constructed, any number of different problems may occur which can impact raster image processing timing. For example, in an IPDS print job, text may be included as an image object (i.e., to be drawn with IOCA commands) instead of as a text object (i.e., to be written with PTOCA commands). An image object typically requires a large amount of data to be transmitted and takes up a significant amount of processing time for a number of different reasons. This processing time can further increase if the image object contains compressed data, requires scaling and/or cropping, is a full-color image as opposed to a monochromatic image, has an unnecessarily high resolution, contains a combination of multiple smaller images, etc. Contrarily, a text object requires only a small amount of data to be transmitted, is rendered using fonts, and takes up very little processing time. Consequently, processing of image objects is more intensive than processing text objects (i.e., takes more time), especially when text rendering is cached on a character basis. Similarly, lines, boxes, or other shapes, may be included as an image object (i.e., to be drawn with IOCA commands) instead of as either a text object (i.e., to be written with PTOCA commands) or a graphic object (i.e., to be drawn with GOCA commands), which also requires less processing time. Other poor construction issues that can be seen in IPDS print jobs include, but are not limited to, text objects containing a single character as opposed to strings of characters; excessive use of GOCA commands for elaborate figures or shapes; failure to use printer resources (also referred to herein as home state resources), such as overlays or page segments for repeated data; failure to use container objects for data in different page description languages (PDLs); the use of a printer resource, such as an overlay or page segment, for non-repeated data because caching of data which is not-repeated within a document uses memory unnecessarily and slows down the search algorithms in the cache. Typically, raster image processing timing is monitored in the printing process and, based on the timing, evaluations of the print job construction are performed and a customer is provided a report after printing is performed.

As mentioned above, the printing system 100 disclosed herein is enabled to perform a raster image processing performance preflight technique prior to document printing so that print job construction can be modified, as necessary, to improve the raster image processing rate for the print job and/or the raster image processing time for specific pages within the print job and, thereby to improve printing efficiency. Specifically, the DFE controller 101 can comprise, for example, a raster image processor 102, a performance monitor 103, a performance analyzer 104, a parser 105, an optional image object analyzer 107, and a report generator 106.

A raster image processing performance preflight option can be enabled on the printing system 100 using any number of different printing system features. For example, raster image processing performance preflight can be selectively enabled by a user input through the GUI 160 or through a switch or some other form of selection option on the printing system 100. Alternatively, raster image processing performance preflight can be enabled automatically by a default, at all times, etc. Alternatively, raster image processing performance preflight can be enabled via a request or flag contained within the print job itself. Thus, in addition to receiving the print job, the input/output 140 can receive (e.g., through the graphic user interface (GUI) 160 or through any of the other means described above) a user input selectively enabling the raster image processing performance preflight option for the print job instead of a printing option (i.e., printing operations associated with the print job are disabled).

When the raster image processing performance preflight option is enabled the raster image processor 102 can perform (e.g., can be adapted to perform, can be configured to perform, can access a program 131 stored in the storage medium 130 and can execute the program 131 to perform, etc.) preliminary raster image processing of the print job to generate preliminary raster pages (i.e., preliminary bitmaps). Each preliminary raster page can correspond to a page in the document to be printed and can comprise one or more different types of data objects (e.g., any one or more of the following: image objects; graphic objects; text objects; container resource objects; barcode objects and printer resource objects (also referred to as home state objects), see detailed discussion above regarding IPDS print job objects). However, instead of serially generating and forwarding these preliminary raster pages to the print engine(s) 110 for printing as would be the case for final (i.e., actual) raster pages during printing, the raster image processor 102 can store (e.g., can be adapted to store, can be configured to store, etc.) the preliminary raster pages 132 in the storage medium 130 for subsequent report generation.

As the preliminary raster pages are generated by the raster image processor 102, the performance monitor 103 can perform (e.g., can be adapted to perform, can be configured to perform, etc.) a monitoring process in order to acquire performance statistics associated with the preliminary raster image processing. That is, the performance monitor 103 can monitor the process of generating the raster pages in order to acquire performance statistics. These performance statistics can comprise, for example, the raster image processing rate (e.g., in pages per minute (PPM)) for the print job as a whole and also the raster image processing time (e.g., in seconds) for each page in the print job. Performance monitors capable of monitoring processing time are well known in the art and, thus, the details of such monitors are omitted from this specification in order to allow the reader to focus on the salient aspects of the disclosed printing system. It should be noted that the performance monitor 103 can be a discrete computer processing unit (i.e., a discrete processor). Alternatively, the performance monitor 103 can be a component of the raster image processor 102. That is, the raster image processor 102 can perform (e.g., can be adapted to perform, can be configured to perform, etc.) self-monitoring functions. In any case, the acquired performance statistics 133 can be stored by the performance monitor 103 on the storage medium 130.

After the performance statistics 133 are acquired by the performance monitor 103 and stored in the storage medium 130, the performance analyzer 104 can determine (e.g., can be adapted to determine, can be configured to determine, can access a program 131 stored in the storage medium 130 and can execute the program 131 to determine, etc.), based on the performance statistics 133, when the print job meets predefined specifications for raster image process timing and when the print job fails to meet the predefined specifications. Such predefined raster image process timing specifications 137 can be stored in the storage medium 130 and typically can comprise, for example, a manufacturer specified minimum raster image processing rate for any print job and a manufacturer specified maximum raster image processing time for any page in a print job.

Additionally, the parser 105 can parse (e.g., can be adapted to parse, can be configured to parse, can access a program 131 stored in the storage medium 130 and can execute the program 131 to parse, etc.), the print job to acquire data object statistics. That is, the parser 105 can analyze each of the pages of the print job to identify data objects contained therein by type and to acquire statistics associated with the different data objects. Specifically, the data object statistics acquired during parsing by the parser 105 can be data object statistics related to the presence of different types of data objects in the print job as a whole and data object statistics related to the presence of different types of data objects on each page within the print job. In either case, the data object statistics can comprise, for example, any of the following: image object statistics; graphic object statistics; text object statistics; container object statistics; barcode object statistics; and printer resource object statistics. The object statistics 134 can be stored by the parser 105 on the storage medium 130.

Following operation of the performance analyzer 104 and parser 105, the report generator 106 can generate and output (e.g., can be adapted to generate and output, can be configured to generate and output, can access a program 131 stored in the storage medium 130 and can execute the program 131 to generate and output, etc.) a first report (i.e., a summary report). This first report can indicate whether the print job meets the predefined raster image process timing specifications 137 and, when the print job fails to meet the predefined raster image process timing specifications 137, this first report can further indicate at least some of the previously acquired performance and data object statistics 133-134.

Figure 2:
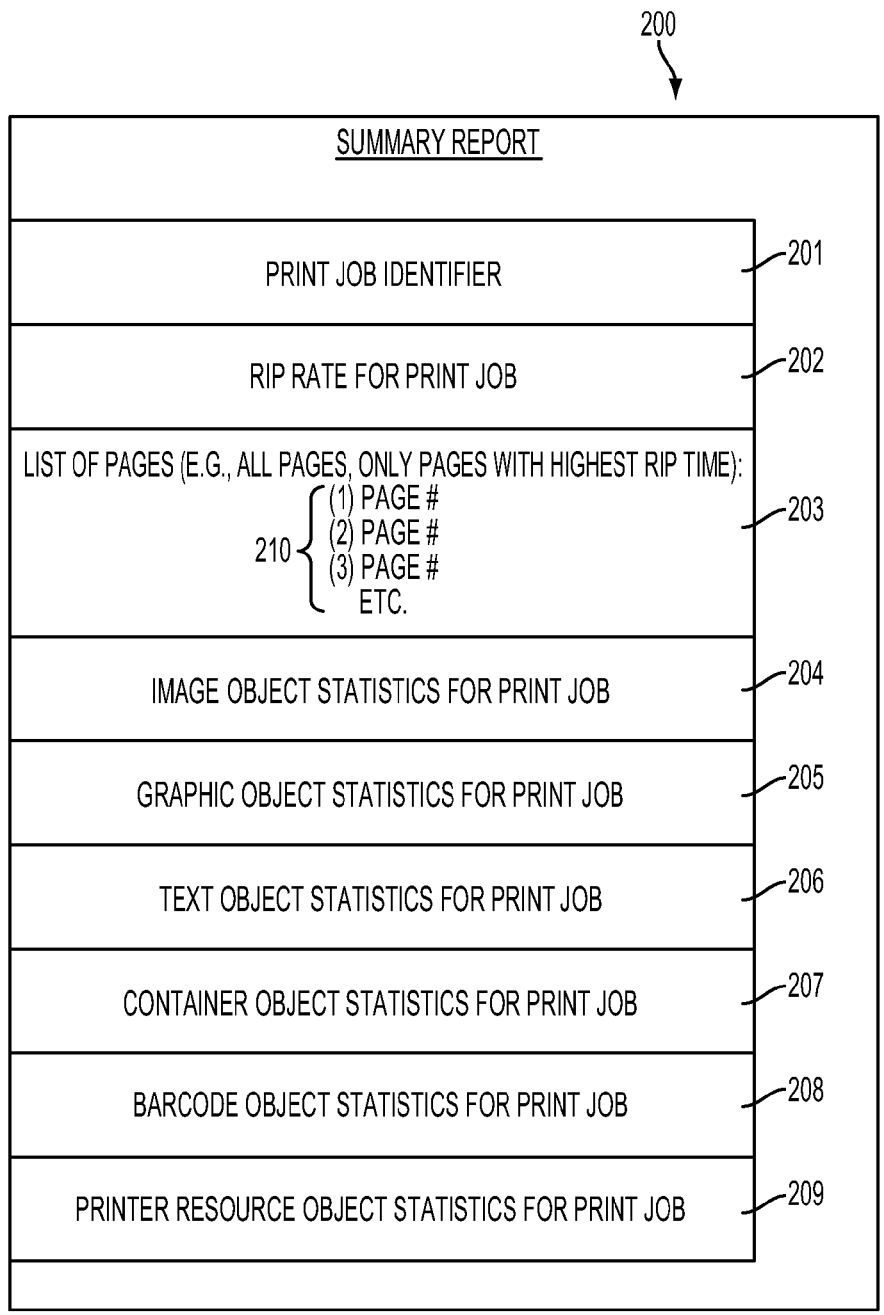
FIG. 2 is an illustration of an exemplary summary report indicating performance statistics and data object statistics for a print job.

FIG. 2 illustrates an exemplary first report 200, which indicates the performance statistics for the print job as a whole, as acquired during preliminary raster image processing, and also the data object statistics for the print job as a whole, as acquired during parsing of the print job. Specifically, referring to FIG. 2 in combination with FIG. 1, this first report 200 can comprise a print job identifier 201 (e.g., name, number, etc.). This first report 200 can further indicate performance statistics for the print job as a whole including, but not limited to, the raster image processing rate 202 (e.g., in pages per minute (PPM)) for the preliminary raster image processing performed by the raster image processor 102 and also a list 203 of specific preliminary raster pages (e.g., a list of all of the preliminary raster pages, a list of those preliminary raster pages requiring the greatest amount of preliminary raster image processing time, such as the top 5, top 10, top 20 or more preliminary raster pages in terms of raster image processing time). This first report 200 can further indicate a number of different types of data object statistics for the print job as a whole. For example, the first report 200 can indicate print job image object statistics 204 including, but not limited to, the following: (1) the average percentage area of image objects per page in the print job; (2) the average percentage area of full color image objects per page in the print job; (3) the average percentage area of cacheable versus non-cacheable image objects per page in the print job; (4) the average percentage area of monochromatic image objects per page in the print job, including details of bi-level (1 bit per pixel) and grayscale (8 bit per pixel); (5) the color models used in the print job (e.g., OCA color, RGB, CMYK, YCbCr, YCrCb, CIELab); (6) the input image resolutions used in the print job; (7) the compression types used in the print job; and (8) the use of transparency masks in the print job. The first report 200 can further indicate graphic object statistics 205 including, but not limited to, the average number of Write Graphics commands per page and the average number of drawing orders per command. The first report 200 can further indicate text object statistics 206 including, but not limited to, the average number of Write Text commands per page and the average length of the text strings in the commands. The first report 200 can further indicate container object statistics 207 (e.g., the average percentage area of container objects per page in the print job, the average use per container object) and barcode object statistics 208 (e.g., the average number of barcode objects per page in the print job). Finally, the first report 200 can indicate printer resource object statistics 209 (also referred to herein as home state resource object statistics) including, but not limited to, the total number of printer resources and the average use per printer resource, the total number of overlays and the average user per overlay, the total number of page segments and the average use per page segment.

This first report 200 can, for example, be output as a hardcopy (e.g., printed by the print engine(s) 110). Preferably, however, this first report 200 can be output as a softcopy and displayed either by the GUI 160 on a local display screen 165 and/or communicated (e.g., over network 195) to another device 190 for display on a remote display screen 191 before the print engine(s) 110 ever initiate any printing of the document. Furthermore, this first report 200 can be displayed such that it comprises embedded selectable second reports 210 and, particularly, embedded selectable page-specific reports.

More particularly, in addition to generating the first report 200, as described above, the report generator 106 can further generate (e.g., can be adapted to generate, can be configured to generate, can access a program 131 stored in the storage medium 130 and can execute the program 131 to generate, etc.), second reports for some or all of the preliminary raster pages 132 (e.g., for only preliminary raster pages that fail to meet the predefined maximum raster image processing time, for only a set number of preliminary raster pages requiring the most raster image processing time, etc.). As shown in FIG. 2, these second reports can be embedded within the list 203 of preliminary raster pages on the first report 200 such that they comprise selectable second reports 210 and such that, in response to selection by a user of a specific preliminary raster page referenced on the list 203 in the first report 200, a second report will be displayed on the display screen. Selection of one of the selectable second reports 210 can be made using any suitable technique (e.g., by single clicking or double clicking on a selectable second report 210 in the list 203).

Figure 3:
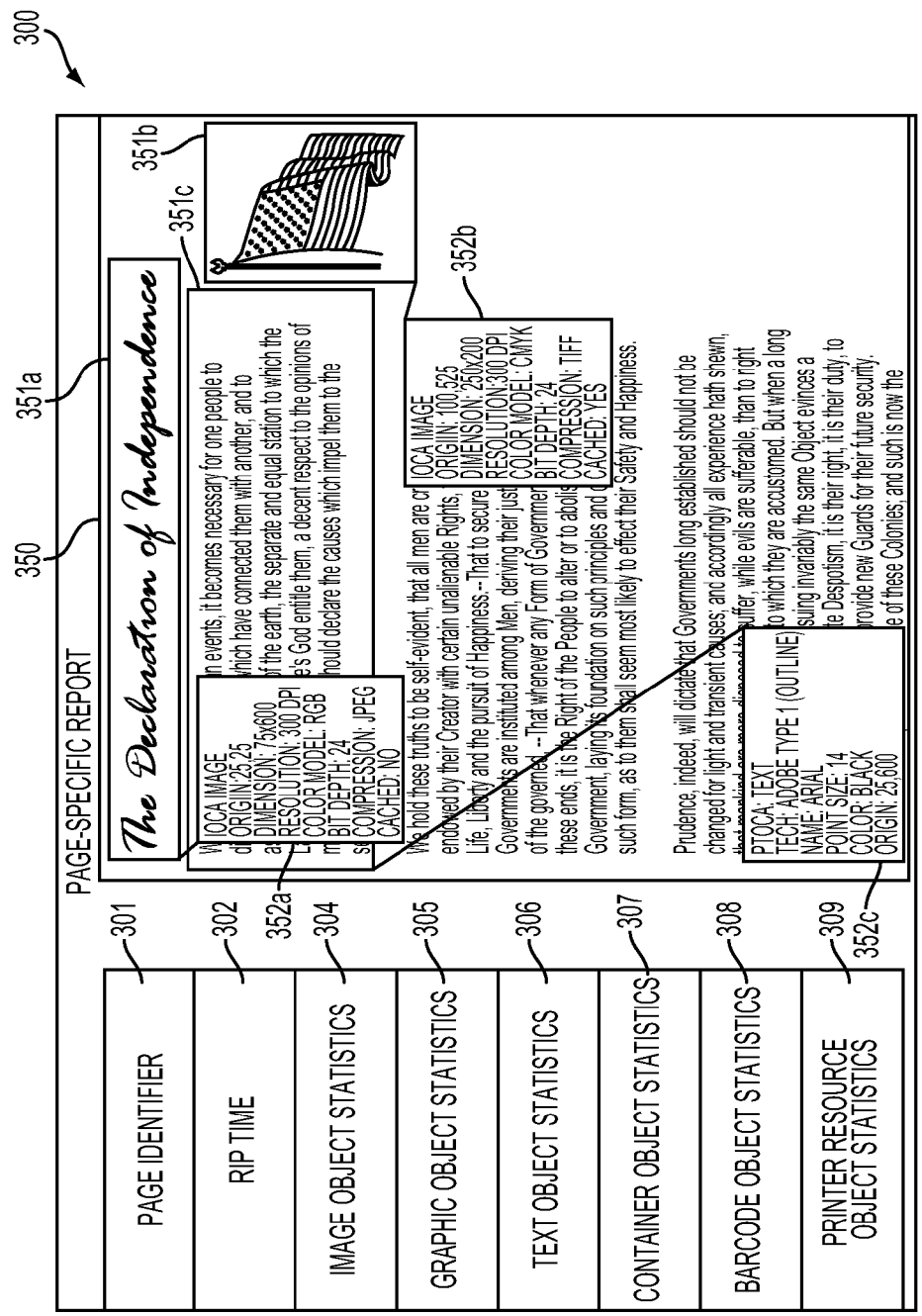
FIG. 3 is an illustration of an exemplary page-specific report that can be embedded in a summary report.

FIG. 3 illustrates an exemplary second report 300 (i.e., a page-specific report). Each second report 300 can comprise page-specific performance and data object statistics for the specific preliminary raster page and a visual representation of the specific preliminary raster page (i.e., a page view). Specifically, each second report 300 can comprise a page identifier 301 (e.g., a page number). Each second report 300 can further contain any performance statistics acquired during preliminary raster image processing for that specific preliminary raster page including, but not limited to, the raster image processing time 302 (e.g., in seconds). Each second report 300 can further contain data object statistics for that specific preliminary raster page acquired during parsing. For example, the second report 300 can indicate page-specific image object statistics 304 including, but not limited to, the following: (1) the percentage area of image objects on the page; (2) the percentage area of full color image objects on the page; (3) the percentage area of cacheable versus non-cacheable image objects on the page; (4) the percentage area of monochromatic image objects on the page, including details of bi-level (1 bit per pixel) and grayscale (8 bit per pixel); (5) the color models used on the page (e.g., OCA color, RGB, CMYK, YCbCr, YCrCb, CIELab); (6) the input image resolutions used on the page; (7) the compression types used on the page; and (8) the use of transparency masks on the page. The second report 300 can further indicate graphic object statistics 305 including, but not limited to, the number of Write Graphics commands on the page and the number of drawing orders per command. Each second report 300 can further indicate text object statistics 306 including, but not limited to, the number of Write Text commands on the page and the average length of the text strings in the commands. Each second report 300 can further indicate container object statistics 307 (e.g., the percentage area of container objects or total number of container objects on the page) and barcode object statistics 308 (e.g., the total number of barcode objects on the page). Finally, each second report 300 can indicate printer resource object statistics 309 (also referred to herein as home state resource object statistics) including, but not limited to, the total number of printer resources on the page, the total number of overlays on the page, and the total number of page segments on the page.

Each second report 300 can also contain a visual representation 350 (i.e., page view) of the specific preliminary raster page. This visual representation 350 can be contained on the same page of the second report 300, as illustrated. Alternatively, the visual representation 350 can be contained on a different page of the second report 300. This different page can be accessed, for example, by scrolling, by activating a link, by selecting an option in a drop down menu, etc. In any case, the visual representation 350 can illustrate the data objects (e.g., see data objects 351*a-c*) on the specific preliminary raster page. Additionally, each data objects 351*a-c* can be selectable such that, in response to selection by a user of a data object, formatting and attribute information specific to the data object is displayed (e.g., in a pop-up windows 352*a-c*), thereby allowing a user to analyze the specific preliminary raster page and the data objects contained thereon. Selection of a data object 351*a-c* can be made using any suitable technique (e.g., it can be automatic when the cursor is moved over the data object; it can be made by single clicking or double clicking; etc.).

Optionally, if any pixel on the visual representation 350 is selected, then the specific data object (i.e., the specific text object, the specific image object, the specific graphic object, the specific barcode object, etc.) within which that pixel is contained will be highlighted and the formatting and attribute information for that specific data object will be displayed (as discussed above). Highlighting a specific data object can be accomplished by displaying a box (i.e., a border, an outline, etc.) around the specific data object (as shown). Alternatively, any other suitable technique for highlighting the specific data object could be used (e.g., conventional highlighting, altering the brightness or boldness of the contents of the data object as compared to other data objects, etc.) Additional visual cues can also be used to indicate the type of data object (e.g., highlighting can be color-coded, such as a red box indicates an image object, a blue box indicates a text object, etc.).

In any case, the formatting and attribute information that is displayed (e.g., in pop-up windows 352*a-c*) may vary depending upon the type of data object. For example, for an image object, the formatting and attribute information can include, but is not limited to, the following: (1) image origin, dimensions, and input data resolution; (2) the color model used for the image object and the number of bits per pixel; (3) any mapping option (i.e., Position and Trim, Scale to Fit, Replicate and Trim, etc.); (4) compression type; and (5) an indication as to whether the image is cached or not. For example, for a text object, the formatting and attribute information can include, but is not limited to, the following: (1) character origin and box dimensions; (2) raster or vector (outline) font information, and input resolution (for raster fonts); and (3) color. For graphic objects and, particularly, vector graphics, the formatting and attribute information can include, but is not limited to, the following: (1) the drawing order; (2) the origin, length and width of the drawing order; and (3) color. For barcode objects, the formatting and attribute information can include, but is not limited to, the following: (1) barcode type; (2) the barcode's presentation area origin and dimensions; and (3) the barcode data.

In the exemplary visual representation 350 of FIG. 3, the data object 351a visually appears to be a text object. However, the formatting and attribute information specific to data object 351a and contained in pop-up window 352a indicates that the data object 351a is actually an uncached image object (i.e., an IOCA) with an origin of 25.25, dimensions of 75×600, a resolution of 300 dots per inch (dpi), a color model of RGB, a bit depth of 24, and a JPEG compression. Data object 351b visually appears to be an image object and the formatting and attribute information specific to data object 351b and contained in pop-up window 352b indicates that the data object 351b is actually a cached image object (i.e., an IOCA) with an origin of 100.525, dimensions of 250×200, a resolution of 300 dots per inch (dpi), a color model of CMYK, a bit depth of 24, and a TIFF compression. Data object 351c visually appears to be a text object and the formatting and attribute information specific to data object 351c and contained in pop-up window 352c indicates that the data object 351c is actually an Adobe Type 1 text object (i.e., a PTOCA) with an Arial font, point size of 14, color of black and origin of 25.600.

It should be noted that, when the first report indicates that the print job meets the predefined specifications, a user can elect to selectively disable the preliminary raster image processing performance preflight option (e.g., through graphic user interface (GUI) 160 or other suitable means) and resubmit the print job. In this case, the input/output 140 again receives the print job; however, since the preliminary raster image processing performance preflight option is disabled, the raster image processor 102 can initiate final raster image processing and printing of the print job. That is, the raster image processor 102 can begin serially generating and forwarding final raster pages to the print engine(s) 110 for printing the document.

It should also be noted that, when the first report indicates that the print job failed to meet the predefined specifications, the performance statistics, data object statistics and other information discussed above as being contained within the first and second reports can be viewed by a user (e.g., in hardcopy, when printed, or softcopy, when displayed on either a local display screen 165 of the GUI 160 or a remote display screen 191 of another device 190) and used to modify the print job and/or used (e.g., by a print service provider) to make recommendations (e.g., to a customer) as to how to best modify the print job in order to improve raster image processing performance (i.e., to increase the raster image processing rate or decrease the raster image processing time associated with specific pages). Thus, after at least the first report and, if applicable, after any second reports are output (e.g., printed print engine(s) 110, displayed on the local display screen 165 of the graphic user interface (GUI) 160, or displayed on a remote display screen 191) a modified print job for the document to be printed by the print engine(s) 110 can be generated (e.g., by a user) so that any modifications made are based on these reports and designed to ensure that the modified print job meets the predefined raster image process timing specifications 137. Those skilled in the art will recognize that a variety of different applications and techniques for modifying the construction of a print job are well known in the art and, thus, the details of those applications and techniques are omitted from this specification order to allow the reader to focus on the salient aspects of the disclosed printing system. The preliminary raster image processing performance preflight option can be selectively enabled or disabled for the modified print job (e.g., by the user through graphic user interface (GUI) 160 or other suitable means) and the modified print job can be submitted to the printing system 100.

In this case, after at least the first report is output, the input/output 140 can receive the modified print job and user input selectively enabling or disabling the raster image processing performance preflight option for that modified print job. If the raster image processing performance preflight option is selectively enabled for the modified print job, performance analysis associated with the modified print job and report generation and output can proceed as described above. If the raster image processing performance preflight option is selectively disabled for the modified print job, final raster image processing and printing of the document by the print engine(s) 110 can proceed.

In the printing system 100 described above, the DFE controller 101 can further comprise an optional image object analyzer 107. This image object analyzer 107 can analyze (i.e., can be adapted to, can be configured to, can access a program 131 stored in the storage medium 130 and execute the program 131 to analyze, etc.) the preliminary raster pages 132 that were produced by the raster image processor 102 and stored in the storage medium 130 in order to identify any duplicate image objects within the preliminary raster pages 132. The image object analyzer 107 can further store a list of these duplicate image objects 135 in the storage medium 130. This process of analyzing the preliminary raster pages 132 to identify duplicate image objects can be performed, for example, using a heuristic approach. In this case the report generator 106 can generate (e.g., can be adapted to generate, can be configured to generate, etc.) the first report so that it indicates, not only the performance statistics and the data object statistics, but so that it also recommends caching of one or more of the previously identified duplicate image objects (e.g., recommends converting the duplicated image object into a printer resource object, such as a page segment or overlay). Specifically, the image object analyzer 107 can analyze the preliminary raster pages 132 to determine which un-cached image objects are duplicated (i.e., repeated) within the print job and, particularly, duplicated enough times such that the raster image processing rate for the print job would benefit (i.e., be increased) if the duplicate image objects are made cacheable (e.g., through the use of a printer resource object, such as an overlay or page segment). In this case, the first report would be generated such that recommends caching of those duplicate image objects.

It should be noted that, since an image object-by-image object comparison would be computationally taxing, the image object analyzer 107 can, optionally, use a heuristic approach to identify the duplicate image objects contained within the preliminary raster pages 132. That is, the image object analyzer 107 can apply a set of predefined image analysis rules 138, which are stored in the storage medium 130, to identify the duplicate image objects contained within the preliminary raster pages 132. The set of predefined image analysis rules 138 can specifically be used to identify duplicated image objects based on similar characteristics including, but not limited to, dimension, position on a page, image type (i.e., format), color space, image data size, bit depth and resolution. Furthermore the set of predefined image analysis rules 138 can specify the threshold number of times an image object can be duplicated (e.g., three or more times, four or more times, etc.) before a recommendation is made to make the duplicated image objects cacheable (i.e., to produce and store, in the storage medium 130, a printer resource 136 for the duplicated image objects).

In any case, if a recommendation is made to produce and store, in the storage medium 130, a printer resource 136 for duplicated image objects, optionally, the first report can be generated by the report generator 106 such that it also contains the duplicated image objects (or at least a random sampling thereof if the image object is replicated a relatively large number of times within the print job) in order to allow a user (e.g., either the print service provide or a customer) to visually confirm that the duplicated image objects are in fact duplicated image objects. Furthermore, if such a recommendation is made, optionally, the recommendation can specify a preferred type of printer resource object to be used based, for example, on the position of the duplicated image objects on the pages of the print job. For example, if the duplicated image objects appear in the same position on each page throughout the job, the recommendation can be for an overlay, whereas if the duplicated image objects appear at multiple different positions and/or with different rotational orientations (see discussion below), the recommendation can be made for a page segment. It should be noted that enhanced level(s) of effort put toward determining whether images are repeated can also be provided depending on the set of predefined image analysis rules 138 used. For example, duplicate image objects with different rotational orientations (e.g., 0 degree and 90 degree) may not be identified when using only the characteristics discussed above; however, they may be identified if additional rules with respect to the image dimensions and/or additional rules with respect to pixel comparisons are predefined.

It should be noted that the various functional components described in detail above (e.g., print media feeder 180, print media transport path(s) 116, print engine(s) 110, finisher 170, input/output 140, computer readable storage medium 130, graphic user interface (GUI) 160 with display screen 165, digital front end (DFE) controller 101, etc.) can operate on power supplied from a power supply 120 (e.g., a power storage element, such as a battery), which can be connected to an external alternating current power source 121 and which can convert the external power from the power source 121 into the type of power needed.

Finally, it should be noted that the printing system 100, as illustrated in FIG. 1, is only one example of the printing system 100 disclosed herein and FIG. 1 is not intended to be limiting. For example, the DFE controller 101 components (i.e., the raster image processor 102, the performance monitor 103, the performance analyzer 104, the parser 105, the optional image object analyzer 107, and the report generator 106) can be implemented, as illustrated in FIG. 1, by discrete computer processing units (i.e., discrete processors). However, it should be understood that, alternatively, any two or more of these components can be implemented by the same single computer processing unit (i.e., by the same processor). Similarly, information (e.g., programs 131, preliminary raster pages 132, performance statistics 133, object statistics 134, list of duplicate image objects 135, printer resources 136, predefined raster image process timing specifications 137, and image analysis rules 138) can be stored, as illustrated in FIG. 1, on the same storage medium 130. However, it should be understood that, alternatively, any two or more of these can be stored on different storage media. Similarly, the printing system 100 can incorporate a limited number of print engines and print media transport paths, as illustrated in FIG. 1. However, it should be understood that, alternatively, the printing system 100 can incorporate any number of one or more print media transport paths and any number of one or more print engines.

Figure 4:
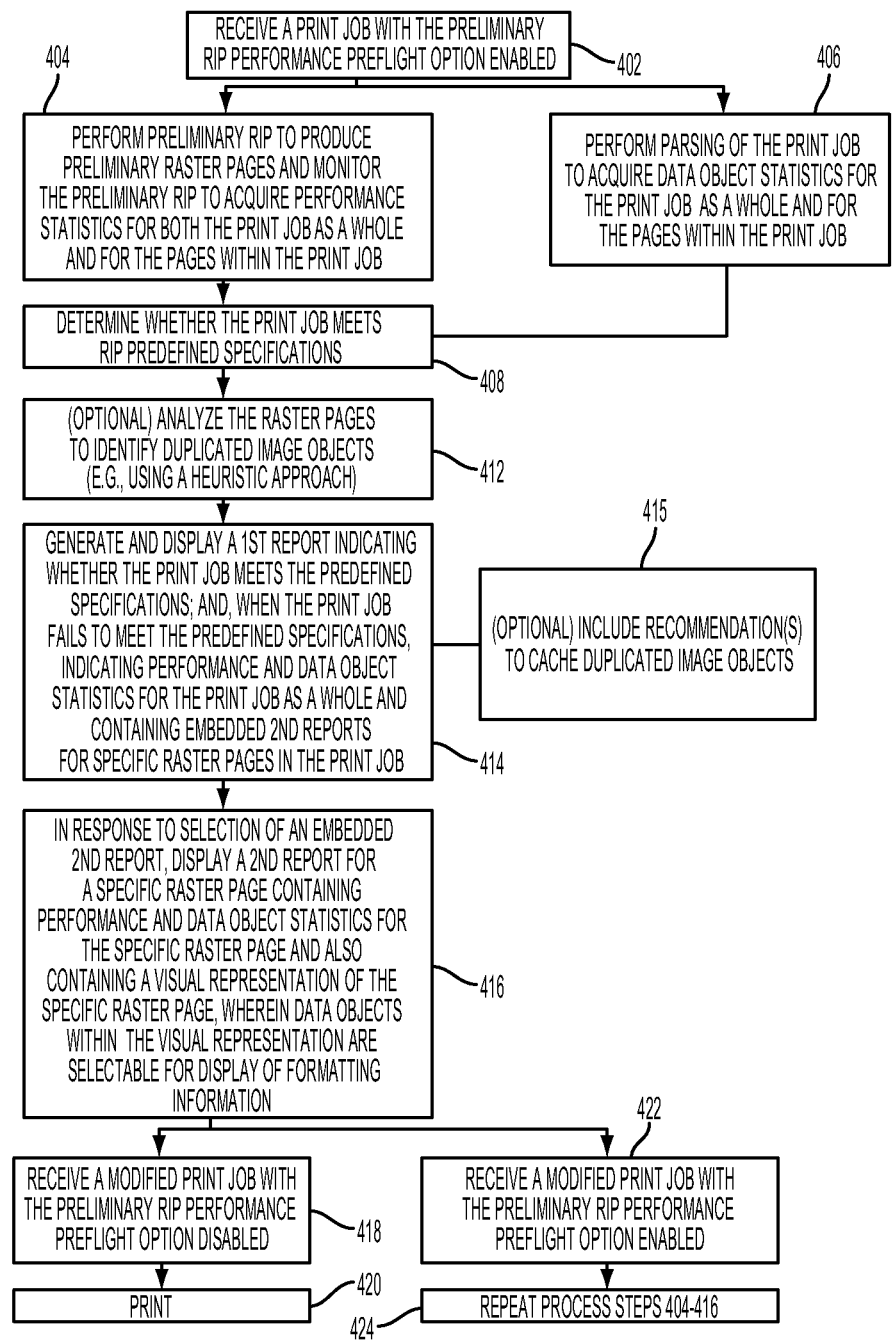
FIG. 4 is a flow diagram illustrating a printing method incorporating a raster image processing performance preflight.

Referring to the flow diagram of FIG. 4 in combination with the printing system 100 diagram of FIG. 1, also disclosed herein is a printing method that incorporates a raster image process (RIP) performance preflight technique. The method can comprise receiving (e.g., by an input/output 140 of a printing system 100) a print job and a user input selectively enabling a raster image processing performance preflight option for the print job (402). As discussed in detail above with regard to the printing system 100, this print job can be formatted in a page description language (PDL) and can describe a document to be printed by print engine(s) 110 of the printing system 100. Furthermore, the user input selectively enabling the raster image processing performance preflight option will disable any printing operations associated with the print job.

When raster image processing performance preflight is enabled on the printing system 100 (e.g., selectively by a user through GUI 160 of the printing system 100, automatically by default, etc.), the method can further comprise performing preliminary raster image processing of the print job to generate preliminary raster pages (i.e., preliminary bitmaps) (404). This preliminary raster image processing 404 can be performed, for example, by a DFE controller 101 of the printing system 100 and, particularly, by a raster image processor 102 thereof. This preliminary raster image processing 404 can further be performed such that each preliminary raster page generated corresponds to a page in the document and comprises one or more different types of data objects (e.g., any one or more of the following: image objects; graphic objects; text objects; container resource objects; barcode objects and printer resource objects (also referred to as home state objects)). However, instead of serially generating and forwarding the preliminary raster pages to print engine(s) 110 of the printing system 100 for printing (as would be the case with final (i.e., actual) raster pages during printing), following preliminary raster image processing 404, the preliminary raster pages 132 can be stored (e.g., by the DFE controller 101 and, particularly, by the raster image processor 102) in a computer readable storage medium 130 of the printing system 100 for subsequent report generation.

As the preliminary raster pages are generated (i.e., as preliminary raster image processing is performed) at process 404, a performance monitoring process can also be performed (e.g., by the DFE controller 101 and, particularly, by a performance monitor 103 thereof) in order to acquire, and store in the computer readable storage medium 130, performance statistics 133 associated with the preliminary raster image processing 404. The performance statistics 133 can comprise, for example, the raster image processing rate (e.g., in pages per minute) for the print job as a whole and also the raster image processing time (e.g., in seconds) for each page in the print job.

Based on the performance statistics 133, a determination can be made (e.g., by the DFE controller 101 and, particularly, by a performance analyzer 104 thereof) as to whether or not the print job meets predefined raster image process timing specifications 137, which are stored in the storage medium 130 (408). That is, a determination can be made as to when the print job meets the predefined raster image process timing specifications 137 and when the print job fails to meet the predefined raster image process timing specifications 137. Such predefined raster image process timing specifications 137 can comprise, for example, a manufacturer specified minimum raster image processing rate for any print job and a manufacturer specified maximum raster image processing time for any page in a print job.

Additionally, the print job can be parsed (e.g., by the DFE controller 101 and, particularly, by a parser 105 thereof) to acquire data object statistics (406). As discussed in detail above with regard to the printing system 100, these data object statistics can comprise statistics related to the presence of different types of data objects in the print job as a whole and statistics related to the presence of different types of data objects on each page within the print job. Specifically, the data object statistics can comprise any of the following for the print job as a whole and also for each page in the print job: image object statistics; graphic object statistics; text object statistics; container object statistics; barcode object statistics; and printer resource object statistics.

Next, a first report (i.e., a summary report) can be generated and output (e.g., by the DFE controller 101 and, particularly, by a report generator 106 of the printing system 100) (414). This first report can be generated such that it indicates whether or not the print job meets the predefined specifications and such that, when the print job fails to meet the predefined specifications, it further indicates the performance statistics for the print job as a whole, as acquired during preliminary raster image processing at process 404, and also the data object statistics for the print job as a whole, as acquired during parsing of the print job at process 406. Since printing operations associated with the print job are disabled when the preliminary raster image processing performance preflight option is enabled, this first report will be generated and output before the print engine(s) 110 ever initiate any printing of the document. The first report can be output at process 414 as a hardcopy and, particularly, printed by the print engine(s) 110 before the print engine(s) 110 ever initiate any printing of the document. Preferably, however, the first report can be output at process 414 as a softcopy and displayed, for example, by the GUI 160 on a local display screen 165 and/or communicated over network 195 to another device 190 for display on a remote display screen 191 before the print engine(s) 110 ever initiate any printing of the document.

FIG. 2 illustrates an exemplary first report 200 (i.e., a summary report) and, as discussed in detail above, this first report 200 can comprise a print job identifier 201; the raster image processing rate 202; a list 203 of specific preliminary raster pages (e.g., a list of all of the preliminary raster pages, a list of those preliminary raster pages requiring the greatest amount of preliminary raster image processing time, etc.); image object statistics 204; graphic object statistics 205; text object statistics 206; container object statistics 207; barcode object statistics 208; and printer resource object statistics 209 (also referred to herein as home state resource object statistics).

When the first report is displayed at process 414 (e.g., on either a local display screen 165 of the GUI 160 or a remote display screen 191 of another device 190), it can be displayed such that it comprises embedded selectable second reports and, particularly, embedded selectable page-specific reports. That is, in addition to generating the first report at process 414, second reports for all of the preliminary raster pages or for only selected preliminary raster pages (e.g., for only preliminary raster pages that fail to meet the predefined maximum raster image processing time, for only a set number of preliminary raster pages requiring the most raster image processing time, etc.) can be generated at process 414 and embedded within the list 203 of preliminary raster pages contained in the first report 200 such that they are selectable and such that, in response to selection by a user of a specific preliminary raster page referenced on the list 203 in the first report 200, a second report is displayed (e.g., by the GUI 160 on a local display screen 165 and/or communicated over network 195 to another device 190 for display on a remote display screen 191) (416). Selection of any one of the selectable second reports 210 can be made using any suitable technique (e.g., by single clicking or double clicking on a selectable second report 210 in the list 203).

As illustrated in FIG. 3 and described in detail above, each second report 300 displayed at process 416 can comprise page-specific performance and data object statistics for a specific preliminary raster page and a visual representation (i.e., page view) of the specific preliminary raster page. Specifically, each second report 300 displayed at process 416 can comprise a page identifier 301; the raster image processing time 302 for the specific preliminary raster page; page-specific image object statistics 304; page-specific graphic object statistics 305; page-specific text object statistics 306; page-specific container object statistics 307; page-specific barcode object statistics 3081 and page-specific printer resource object statistics 309. Additionally, each second report 300 displayed at process 416 can contain a visual representation 350 of the specific preliminary raster page selected. This visual representation 350 can be displayed on the same page of the second report 300 as the statistics, as illustrated. Alternatively, this visual representation 350 can be displayed on a different page of the second report 300. In any case, the visual representation 350 can be generated and displayed such that the data objects (e.g., see data objects 351a-c) are selectable and such that, in response to selection by a user of a data object, formatting and attribute information specific to the data object will further be displayed (e.g., in a pop-up windows 352a-c), thereby allowing a user to analyze the specific preliminary raster page and the data objects contained thereon. Selection of a data object 351a-c can be made using any suitable technique (e.g., it can be automatic when the cursor is moved over the data object; it can be made by single clicking or double clicking; etc.).

Optionally, if any pixel on the visual representation 350 is selected, then the specific data object (i.e., the specific text object, the specific image object, the specific graphic object, the specific barcode object, etc.) within which that pixel is contained will be highlighted and the formatting and attribute information for that specific data object will be displayed (as discussed above). Highlighting a specific data object can be accomplished by displaying a box (i.e., a border, an outline, etc.) around the specific data object (as shown). Alternatively, any other suitable technique for highlighting the specific data object could be used (e.g., conventional highlighting, altering the brightness or boldness of the contents of the data object as compared to other data objects, etc.) Additional visual cues can also be used to indicate the type of data object (e.g., highlighting can be color-coded, such as a red box indicates an image object, a blue box indicates a text object, etc.). In any case, as discussed in detail above, the formatting and attribute information that is displayed (e.g., in pop-up windows 352a-c) may vary depending upon the type of data object.

In the print method disclosed herein the performance statistics, data object statistics and other information displayed in the first and second reports at processes 414-416 can be viewed by a user (e.g., on either a local display screen 165 of the GUI 160 or a remote display screen 191 of another device 190) and used to modify the print job and/or can be used (e.g., by a print service provider) to make recommendations (e.g., to a customer) as to how to best modify the print job in order to improve raster image processing performance (i.e., to increase the raster image processing rate or decrease the raster image processing time associated with specific pages).

It should be noted that, when the first report indicates that the print job meets the predefined specifications, a user can elect to selectively disable the preliminary raster image processing performance preflight option (e.g., through graphic user interface (GUI) 160 or other suitable means) and resubmit the print job. In this case, since the preliminary raster image processing performance preflight option is disabled, final raster image processing and printing of the print job will be initiated.

It should also be noted that, when the first report indicates that the print job failed to meet the predefined specifications, the performance statistics, data object statistics and other information in the first and second reports, as discussed above, can be employed by a user to modify the print job and/or to make recommendations as to how a print job can be modified in order to improve raster image processing performance (i.e., to increase the raster image processing rate or decrease the raster image processing time associated with specific pages). Specifically, after at least the first report and, if applicable, after any second reports are output (e.g., printed print engine(s) 110, displayed on the local display screen 165 of the graphic user interface (GUI) 160, or displayed on a remote display screen 191) a user can modify the print job (i.e., generate a modified print job) based on the reports to ensure that the predefined specifications for raster image process timing are met. Then, the user can selectively disable or enable the preliminary raster image processing performance preflight option (e.g., through graphic user interface (GUI) 160)) and can submit the modified print job to the printing system 100. In this case, the method can further comprise receiving the modified print job. If the raster image processing performance preflight option is selectively disabled when the modified print job is received (418), final raster image processing of the modified print job and printing of document can proceed (420). If the raster image processing performance preflight option is selectively enabled when the modified print job is received (422), performance analysis of the modified print job and report generation and output can proceed as described above (424).

Optionally, in the printing method described above, prior to generation of the first report at process 414, the preliminary raster pages 132 generated at process 404 can be analyzed (e.g., by the DFE controller 101 and, particularly, by an image object analyzer 107 thereof) to identify any duplicate image objects within the preliminary raster pages 132 and store a list of these duplicate image objects 135 in the storage medium 130 (412). This process 412 of analyzing the preliminary raster pages 132 to identify duplicate image objects can be performed, for example, using a heuristic approach. In this case the first report can be generated (e.g., by the report generator 106) so that it indicates, not only the performance statistics and the data object statistics, but so that it also recommends caching of one or more of the previously identified duplicate image objects (e.g., recommends converting the duplicated image object into a printer resource object, such as a page segment or overlay) (415). This recommendation can, optionally, contain the duplicated image objects (or at least a random sampling thereof if the image object is replicated a relatively large number of times within the print job) in order to allow a user to visually confirm that the duplicated image objects are in fact duplicated image objects. This recommendation can, optionally, specify a preferred type of printer resource object to be used based, for example, on the position of the duplicated image objects on the pages of the print job. For example, if the duplicated image objects appear in the same position on each page throughout the job, the recommendation can be for an overlay, whereas if the duplicated image objects appear at multiple different positions and/or with different rotational orientations, the recommendation can be made for a page segment.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer, printing device or printing system as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

Therefore, disclosed above is a printing system enabled to perform a raster image processing performance preflight technique prior to document printing. This preflight technique involves collecting and displaying preliminary raster image processing performance statistics and data object statistics associated with a document print job in order to allow a user to modify the print job and improve the raster image processing rate for the print job and/or the raster image processing time for specific pages within the print job. The printing system receives a print job with a user input selectively enabling a performance preflight option. The printing system parses a print job to acquire data object statistics, performs preliminary raster image processing of the print job to generate preliminary raster pages, monitors the preliminary raster image processing to acquire performance statistics, determines (based on the performance statistics) whether or not the print job meets predefined specifications for raster image process timing and generates and displays a summary report indicating whether the print job failed to meet the predefined specifications and, if so, the performance statistics and the data object statistics for the print job. Page-specific selectable reports can be embedded in the summary report to allow a user to selectively view page-specific data object statistics and visual representations of specific preliminary raster pages. Such reports can subsequently be used to modify the print job to improve the raster image processing rate for the print job and/or the raster image processing time for specific pages within the print job and, thereby improve printing efficiency. Also disclosed herein is an associated printing method.

What is claimed is:

1. A printing system comprising:
a print engine;
an input/output receiving a print job for a document to be printed by said print engine;
a storage medium; and
a controller operatively connected to said print engine, said input/output, and said storage medium, said controller comprising:
  a parser parsing said print job in order to acquire data object statistics;
  a raster image processor performing preliminary raster image processing of said print job to generate preliminary raster pages, said raster image processor storing said preliminary raster pages on said storage medium;
  a performance monitor monitoring said preliminary raster image processing to acquire performance statistics associated with said preliminary raster image processing;
  a performance analyzer determining, based on said performance statistics, when said print job meets predefined specifications for raster image process timing and when said print job fails to meet said predefined specifications; and
  a report generator generating and outputting a first report indicating whether said print job fails to meet said predefined specifications and, when said print job fails to meet said predefined specifications, further indicating at least some of said performance statistics and said data object statistics, said first report being output before said print engine prints said document.

2. The printing system of claim 1, further comprising a graphic user interface operatively connected to said controller and displaying said first report.

3. The printing system of claim 1, said input/output further receiving a user input with said print job, said user input selectively enabling a raster image processing performance preflight option instead of a printing option.

4. The printing system of claim 1, said raster pages comprising any of the following:
image objects;
graphic objects;
text objects;
container resource objects; and
printer resource objects.

5. The printing system of claim 1,
said performance statistics comprising any of said following:
  a raster image processing rate for said print job;
  a raster image processing time for each page in said print job; and
said data object statistics comprising any of said following:
  image object statistics;
  graphic object statistics;
  text object statistics;
  container object statistics; and
  printer resource object statistics.

6. The printing system of claim 2, said first report being displayed by said graphic user interface such that a specific preliminary raster page is selectable and said report generator further generating a second report comprising page-specific data object statistics and a visual representation of said specific preliminary raster page, said graphic user interface displaying said second report in response to selection of said specific preliminary raster page on said graphic user interface.

7. The printing system of claim 6, said visual representation of said specific preliminary raster page illustrating a plurality of data objects, said data objects being selectable and said graphic user interface further displaying, in response to selection of a data object, formatting and attribute information specific to said data object.

8. The printing system of claim 1, said input/output further receiving a modified print job for printing of said document by said print engine after said first report is output.

9. A printing system comprising:
a print engine;
an input/output receiving a print job for a document to be printed by said print engine;
a storage medium;
a graphic user interface; and
a controller operatively connected to said print engine, said input/output, said storage medium and said graphic user interface, said controller comprising:
  a parser parsing said print job in order to acquire data object statistics;
  a raster image processor performing preliminary raster image processing of said print job to generate preliminary raster pages, said raster image processor storing said preliminary raster pages on said storage medium;
  a performance monitor monitoring said preliminary raster image processing to acquire performance statistics associated with said preliminary raster image processing;
  a performance analyzer determining, based on said performance statistics, when said print job meets predefined specifications for raster image process timing and when said print job fails to meet said predefined specifications; and,
  an image object analyzer analyzing said preliminary raster pages to identify any duplicate image objects in said preliminary raster pages; and
  a report generator generating a first report indicating whether said print job fails to meet said predefined specifications and, when said print job fails to meet said predefined specifications, further indicating at least some of said performance statistics and said data object statistics and recommending caching of said duplicate image objects, and said graphic user interface displaying said first report before said print engine prints said document.

10. The printing system of claim 9, said input/output further receiving a user input with said print job, said user input selectively enabling a raster image processing performance preflight option instead of a printing option.

11. The printing system of claim 9, said raster pages comprising any of the following:
   image objects;
   graphic objects;
   text objects;
   container resource objects; and
   printer resource objects.

12. The printing system of claim 9,
   said performance statistics comprising any of said following:
      a raster image processing rate for said print job;
      a raster image processing time for each page in said print job; and
   said data object statistics comprising any of said following:
      image object statistics;
      graphic object statistics;
      text object statistics;
      container object statistics; and
      printer resource object statistics.

13. The printing system of claim 9, said first report being displayed by said graphic user interface such that a specific preliminary raster page is selectable and said report generator further generating a second report comprising page-specific data object statistics and a visual representation of said specific preliminary raster page, said graphic user interface displaying said second report, in response to selection of said specific preliminary raster page on said graphic user interface.

14. The printing system of claim 13, said visual representation of said specific preliminary raster page illustrating a plurality of data objects, said data objects being selectable and said graphic user interface further displaying, in response to selection of a data object, formatting and attribute information specific to said data object.

15. The printing system of claim 9, said input/output further receiving a modified print job for printing of said document by said print engine after said first report is output.

16. The printing system of claim 13, said image object analyzer using a heuristic approach to identify said duplicate image objects.

17. A printing method comprising:
   receiving, by an input/output of a printing system, a print job for a document to be printed by a print engine of said printing system;
   parsing, by a controller of said printing system, said print job to acquire data object statistics;
   performing, by said controller, preliminary raster image processing of said print job to generate preliminary raster pages;
   storing, by said controller, said preliminary raster pages on a storage medium of said printing system;
   monitoring, by said controller, said preliminary raster image processing to acquire performance statistics associated with said preliminary raster image processing;
   determining, by said controller based on said performance statistics, when said print job meets predefined specifications for raster image process timing and when said print job fails to meet said predefined specifications;
   generating and outputting, by said controller before said print engine prints said document, a first report indicating whether said print job fails to meet said predefined specifications and, when said print job fails to meet said predefined specifications, further indicating at least some of said performance statistics and said data object statistics.

18. The printing method of claim 17, further comprising displaying, by a graphic user interface of said printing system, said first report.

19. The printing method of claim 17, said receiving further comprising receiving a user input with said print job, said user input selectively enabling a raster image processing performance preflight option instead of a printing option.

20. The printing method of claim 17, said raster pages comprising any of said following:
   image objects;
   graphic objects;
   text objects;
   container resource objects; and
   printer resource objects.

21. The printing method of claim 17,
   said performance statistics comprising any of the following:
      a raster image processing rate for said print job;
      a raster image processing time for each page in said print job; and
   said data object statistics comprising any of said following:
      image object statistics;
      graphic object statistics;
      text object statistics;
      container object statistics; and
      printer resource object statistics.

22. The printing method of claim 18,
   said displaying of said first report being performed such that a specific preliminary raster page is selectable, and
   said method further comprising:
      generating, by said controller, a second report comprising page-specific data object statistics and a visual representation of said specific preliminary raster page, said visual representation of said specific preliminary raster page illustrating a plurality of data objects;
      displaying, by said graphic user interface, said second report in response to selection of said specific preliminary raster page on said graphic user interface, said displaying of said second report being performed such that said data objects are selectable; and
      displaying, by said graphic user interface in response to selection of a data object, formatting and attribute information specific to said data object.

23. The printing method of claim 22, further comprising receiving, by said input/output, a modified print job for printing of said document by said print engine after said first report is output.

24. A printing method comprising:
   receiving, by an input/output of a printing system, a print job for a document to be printed by a print engine of said printing system;
   parsing, by a controller of said printing system, said print job to acquire data object statistics;
   performing, by said controller, preliminary raster image processing of said print job to generate preliminary raster pages;
   storing, by said controller, said preliminary raster pages on a storage medium of said printing system;
   monitoring, by said controller, said preliminary raster image processing to acquire performance statistics associated with said preliminary raster image processing;

determining, by said controller based on said performance statistics, when said print job meets predefined specifications for raster image process timing and when said print job fails to meet said predefined specifications;

analyzing, by said controller and using a heuristic approach, said preliminary raster pages to identify any duplicate image objects in said preliminary raster pages;

generating, by said controller, a first report indicating whether said print job meets said predefined specifications and, when said print job fails to meet said predefined specifications, further indicating at least some of said performance statistics and said data object statistics and recommending caching of said duplicate image objects; and displaying, by a graphic user interface of said printing system, said first report before said print engine prints said document.

* * * * *